A. F. SZCZEPANSKI.
BREAD BOARD OR PEEL.
APPLICATION FILED AUG. 31, 1914.
1,135,634.
Patented Apr. 13, 1915.
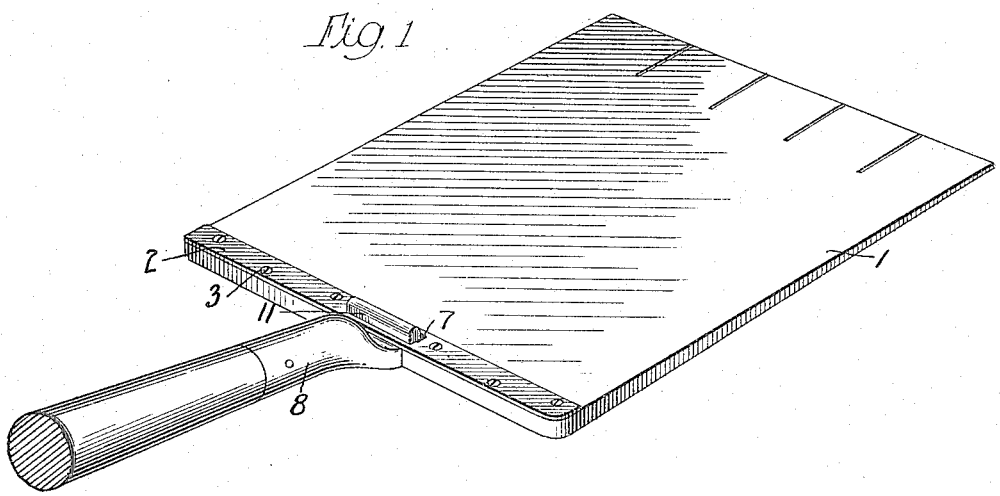
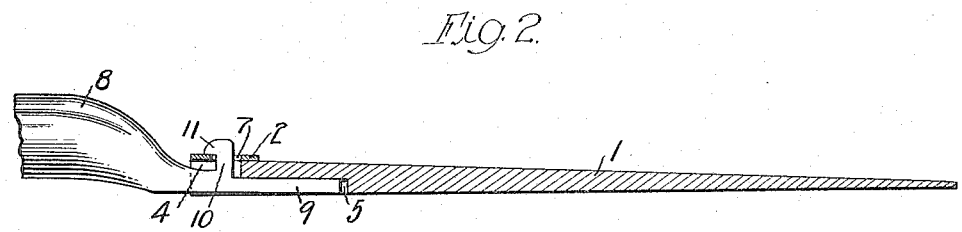
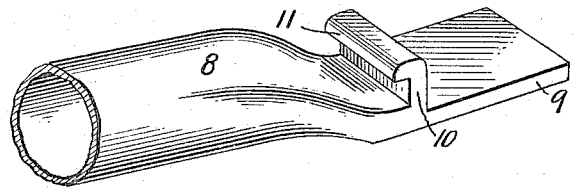
Inventor
Antoni F. Szczepanski,
By Pagelsen & Spencer.
Attorney
Witnesses
E. R. Barrett
H. W. Kreinbring

UNITED STATES PATENT OFFICE.

ANTONI F. SZCZEPANSKI, OF DETROIT, MICHIGAN.

BREAD BOARD OR PEEL.

1,135,634.

Specification of Letters Patent.

Patented Apr. 13, 1915.

Application filed August 31, 1914. Serial No. 859,270.

*To all whom it may concern:*

Be it known that I, ANTONI F. SZCZEPANSKI, a subject of the Czar of Russia, and a resident of Detroit, in the county of Wayne and State of Michigan, have invented a new and Improved Bread Board or Peel, of which the following is a specification.

This invention relates to a device for simultaneously placing a plurality of loaves of bread or the like in an oven; and its object is to provide, in combination with a plurality of bread boards, each of which is adapted to support a plurality of loaves of bread or the like, a detachable handle by means of which any one of the boards may be selected and all the articles supported thereon placed in an oven at the same time.

The invention consists in the details of construction shown, described and particularly pointed out in the claims.

In the drawings, Figure 1 is a perspective view of the peel or board with the detachable handle. Fig. 2 is a central longitudinal section corresponding to Fig. 1. Fig. 3 is a perspective view of the inner end of the handle.

Similar reference characters refer to like parts throughout the several views.

In the embodiment shown, the body of the board or peel comprises the preferably rectangular member 1, that may be of wood, and the transverse metal strip 2 which is secured to the member 1 in any desired manner, such as by the screws 3, and constitutes a reinforcing means for the wearing edge of this member. The central portion of the rear edge of the board is cut away to form the slot 4, the lower part of which merges into the longitudinal depression 5 in the lower side of the board; and the reinforcing strip 2 is provided with a slot 7 that registers with the slot 4.

The slot 4 and depression 5 are adapted to receive a detachable handle 8 that comprises the rectangular end 9 from the rear of which projects the upstanding lug 10, the dimension of which, transversely of the handle, is substantially equal to the length of the slot 7 in the metal strip 2, while its dimension longitudinally of the handle is somewhat less than the width of the said slot. The upper end of the lug 10 has formed along its rear edge the flange or rib 11, the depth of which, together with the thickness of the lug 10, is slightly less than the width of the slot 7 in the reinforcing strip.

As shown the handle 8 is formed in two sections, but it is obvious that they may be made integral.

Operation: There are provided a plurality of similar bodies upon each of which a number of loaves of unbaked bread or the like may be placed. When the bread is to be put into the oven, the detachable handle is engaged with the corresponding board and the entire number of loaves on the board is inserted at one time, the tins or loaves being slid off from the peel by pulling the latter back quickly from the oven. It will be seen that much of the time, as well as the heat, lost in inserting the loaves in the oven singly or successively, as in present practice, is thus avoided, and a much more uniform baking of the contents of the oven is secured.

It is also obvious that many changes may be made in the details of construction without departing from the spirit of my invention. I do not, therefore, wish to be limited otherwise than as pointed out in the subjoined claims.

The particular value of this board or peel resides in the fact that the dough, after being kneaded and formed into loaves, may be placed on the peels, then placed in the proof or steam box where it may rise, after which it can be placed in the oven by one man without assistance and without removal from the peels or other handling. This obviates the necessity of the use of the ordinary boxes in which the loaves are placed for rising and which require two men, and from which the loaves must be taken by hand and separated, and then placed by hand on the ordinary peels before being placed in the oven. This is not only a great saving in time and labor but it also insures superior and sanitary bread as it is not touched by hand after being kneaded and formed.

I claim:—

1. A bread board or peel comprising a body and a handle by which the body may be wholly supported and with reference to the axis of which the body is substantially symmetrical, said body having a slot formed in one edge and said slot merging into a depression in the lower side of the body, means on the handle conforming to the depression in the body and extending through the slot to interlock with a part of the body, whereby relative angular movement of the body in respect to the handle in one direction is prevented.

2. A bread board or peel comprising a body, means whereby a socket is formed in the upper part of the body near one edge thereof, a detachable handle having an end portion arranged to engage with the lower side of the body at a point inwardly beyond the socket, said handle also having means thereon arranged to enter the socket from below and serving to prevent the handle from being accidentally detached from the body by being swung downwardly about its own inner end as a fulcrum.

3. A bread board or peel comprising a body and a detachable handle by which the body may be wholly supported and with reference to the axis of which the body is symmetrical, means whereby a socket is formed in the body near one edge thereof, said handle having an end portion arranged to engage with the lower portion of the body at a point inwardly beyond the socket, said handle also having means thereon arranged to enter the socket from below and serving to prevent the handle from being accidentally detached from the body by being swung downwardly about its own inner end as a fulcrum.

4. A bread board or peel comprising two members, one a body and the other a detachable handle by which the body may be wholly supported and with reference to the axis of which the body is symmetrical, said handle having an end portion arranged to engage with one face of the body, one of the members having a socket therein, and the other member having a projection thereon received in said socket, said socket and said projection being located outside of the point at which the end of the handle engages with the body, and means for normally preventing the projection from being withdrawn from the socket either by a swinging movement of the handle in one direction about its inner end or by a swinging movement in the opposite direction about the point of connection of the socket and projection.

5. A bread board or peel comprising two members, one a body and the other a detachable handle by which the body may be wholly supported and with reference to the axis of which the body is symmetrical, said handle having an end portion arranged to engage with one face of the body, one of the members having a socket therein, and the other member having a projection thereon received in said socket, said socket and said projection being located outside of the point at which the end of the handle engages with the body, said socket and said projection being proportioned to allow limited longitudinal movement of the handle in respect to the body when the projection is received in the socket, and means whereby, when the handle is at one limit of its longitudinal movement, swinging movement of the handle about its inner end is prevented and whereby, when the handle is at the other limit of its longitudinal movement, such swinging movement of the handle about its inner end is allowed.

6. A bread board or peel comprising two members, one a body and the other a detachable handle by which the body may be wholly supported and with reference to the axis of which the body is symmetrical, said handle having an end portion arranged to engage with one face of the body, one of the members having a socket therein, and the other member having a projection thereon received in said socket, said socket and said projection being located outside of the point at which the end of the handle engages with the body, said socket and said projection being proportioned to allow limited longitudinal movement of the handle in respect to the body when the projection is received in the socket, and a rib on said projection whereby, when the handle is at one limit of its longitudinal movement, swinging movement of the handle about its inner end is prevented.

In testimony whereof I have signed this specification in the presence of two subscribing witnesses.

ANTONI F. SZCZEPANSKI.

Witnesses:
EDWARD N. PAGELSEN,
HUGO W. KREINBRING.

Copies of this patent may be obtained for five cents each, by addressing the "Commissioner of Patents, Washington, D. C."